United States Patent
Baudoin et al.

(10) Patent No.: US 10,502,134 B2
(45) Date of Patent: Dec. 10, 2019

(54) REDUCTION OF TURBOFAN NOISE

(71) Applicant: Snecma, Paris (FR)

(72) Inventors: Laurent Louis Robert Baudoin, Paris (FR); Georges Jean Xavier Riou, Melun (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 301 days.

(21) Appl. No.: 14/948,623

(22) Filed: Nov. 23, 2015

(65) Prior Publication Data

US 2016/0146106 A1 May 26, 2016

(30) Foreign Application Priority Data

Nov. 24, 2014 (FR) ...................... 14 61373

(51) Int. Cl.
*F02C 7/045* (2006.01)
*F04D 19/00* (2006.01)
(Continued)

(52) U.S. Cl.
CPC ............ *F02C 7/045* (2013.01); *F04D 19/002* (2013.01); *F04D 29/522* (2013.01);
(Continued)

(58) Field of Classification Search
CPC .......... F01D 25/04; F01D 25/24; F02C 7/045; F04D 19/002; F04D 29/522; F04D 29/66; F04D 29/661; F04D 29/663; F04D 29/664; F04D 29/666; F04D 29/668; G10K 10/172; B64D 2033/0206; F05D 2220/36;
(Continued)

(56) References Cited

U.S. PATENT DOCUMENTS 3,508,838 A   4/1970 Martenson
3,819,009 A   6/1974 Motsinger
(Continued)

FOREIGN PATENT DOCUMENTS

EP   1701028 A2   9/2006
FR   2 018 209 A1   5/1970
(Continued)

OTHER PUBLICATIONS

Search Reprot issued in French Patent Application No. FR 14 61373 dated Jul. 24, 2015.
(Continued)

*Primary Examiner* — Jason D Shanske
*Assistant Examiner* — Sang K Kim
(74) *Attorney, Agent, or Firm* — Pearne & Gordon LLP

(57) ABSTRACT

The invention relates to an aircraft turbofan type engine (1) comprising an air intake duct (2) having an inner face provided with an acoustic attenuation shroud (11) located upstream from a fan (3) of this engine (1). This acoustic attenuation shroud (11) comprises a regular alternation of first portions and second portions with different first and second thicknesses along the radial direction, the number of alternations being greater than twice the number of passing azimuth acoustic vibration modes occurring in the engine (1) without the acoustic attenuation shroud (11) operating under conditions corresponding to a landing phase and a take-off phase.

5 Claims, 3 Drawing Sheets

(51) Int. Cl.
*F04D 29/52* (2006.01)
*F04D 29/66* (2006.01)

(52) U.S. Cl.
CPC ........ *F04D 29/663* (2013.01); *F05D 2220/36* (2013.01); *F05D 2260/96* (2013.01)

(58) Field of Classification Search
CPC ........... F05D 2240/91; F05D 2250/182; F05D 2250/283; F05D 2260/96; F05D 2260/963; Y02T 50/672
See application file for complete search history.

(56) References Cited

U.S. PATENT DOCUMENTS

| | | | |
|---|---|---|---|
| 3,937,590 A | 2/1976 | Mani | |
| 4,858,721 A | 8/1989 | Autie | |
| 5,782,082 A | 7/1998 | Hogeboom et al. | |
| 2014/0321999 A1* | 10/2014 | Guilbert | F02C 7/045 415/182.1 |

FOREIGN PATENT DOCUMENTS

| | | |
|---|---|---|
| FR | 2 216 445 A1 | 8/1974 |
| FR | 2 284 158 A1 | 4/1976 |
| FR | 2 317 504 A1 | 2/1977 |
| FR | 2980241 A1 | 3/2013 |
| FR | 3 005 100 A1 | 10/2014 |
| FR | 3022218 A1 | 12/2015 |
| GB | 2453941 A | 4/2009 |

OTHER PUBLICATIONS

Great Britain Search Report issued in application No. GB1520748.3 dated May 23, 2016.
Rienstra, S.W., "Noise in Turbomachines: Sound Propagation in Ducts", von Karman Institute for Fluid Dynamics, Lecture Series Feb. 2000, Eindhoven University of Technology, The Netherlands, Feb. 14-17, 2000.
Machine translation of the abstract for Thesis by Yann Druon, entitled "Etude de la propagation guidée et du rayonnement acoustiques par les conduits d'éjection de turboréacteur Modélisations analytiques et numériques", 2006.
Translation of another section of a previously cited reference: Thesis by Yann Druon, entitled "Etude de la propagation guidée et du rayonnement acoustiques par les conduits d'éjection de turboréacteur Modélisations analytiques et numériques", 2006 (Thesis cited in IDS filed Aug. 22, 2018).

* cited by examiner

REDUCTION OF TURBOFAN NOISE

TECHNICAL DOMAIN

The invention relates to attenuation of the acoustic emission level generated by a turbofan type engine in operation.

STATE OF PRIOR ART

With this type of engine, outside air is drawn into an air intake duct through a fan, comprising a series of rotating blades. This flow is then divided into a central core engine flow and a fan flow surrounding the core engine flow.

The core engine flow is then compressed before it enters a combustion chamber, and it then expands passing through a turbine before being evacuated in the aft direction while generating thrust. The fan flow is propelled directly in the aft direction by the fan to generate part of the thrust.

Reduction in the noise emission level from such an engine consists particularly of reducing the power of the various noise sources and attenuating the acoustic energy of these sources by treatment.

A distinction is made between two acoustic energy propagation directions, namely an "upstream" direction in which acoustic energy is propagated in the direction opposite to the air flow, and a "downstream" direction in which energy is propagated along the direction of the air flow in the engine.

In the case of noise propagating in the upstream direction, several different sources can be distinguished. One of these sources is related to interaction of the assembly composed of the fan and its guide vanes, with the air flow passing through them. These guide vanes are particularly fixed vanes adapted to guide the air flow after its passage through the fan. The guide vanes may also comprise structural arms holding the casing in position around the fan.

The inner face of the air intake duct comprises acoustic attenuation elements that can attenuate upstream noise.

This air intake duct is fixed onto the casing surrounding the fan, also called the fan case, that provides acoustic attenuation because it is provided with an acoustic treatment shroud upstream from the fan considering the direction of the air flow in the turbomachine. This attenuation element is fixed to the fan case through attachment devices located on its outer face.

An additional complementary annular attenuation panel is installed in the air intake duct upstream from the acoustic treatment shroud that is itself immediately upstream from the fan. This annular panel is fixed to elements located upstream from the fan case rather than to the fan case itself.

The noise generated in the engine at the assembly composed of the fan and the guide vanes and that propagates in the forward direction in the opposite direction to the air flow inlet into the duct, is thus reduced due to the acoustic treatment shroud and also to the annular panel located upstream from this shroud.

The shroud that is immediately upstream from the fan blades is usually formed from several distinct acoustic elements. When a projectile such as a pebble enters the air duct, it bounces on the fan blades and then on this shroud, before passing through the engine. The impact of the projectile can be sufficient to damage an acoustic attenuation panel, which then makes it necessary to replace it.

However, this architecture in several panels severely penalises acoustic noise levels, and furthermore the risk of deterioration has become very limited due to the use of composite materials to make this shroud.

It has thus been envisaged to manufacture a single-piece shroud, in other words a shroud made of a single element, to improve acoustic attenuation. But the attachment zones of this shroud remain acoustically penalising particularly because they form discontinuities in this shroud, which are known to be penalising in themselves in terms of acoustic attenuation.

The purpose of this invention is thus to design a noise attenuation shroud that will be located immediately upstream from the fan but that is in the form of a single piece shroud while improving the acoustic attenuation efficiency, in comparison with known single-piece shrouds.

PRESENTATION OF THE INVENTION

The invention relates to a method of designing an acoustic attenuation shroud designed to be installed on the inner face of an air intake duct of a turbofan type engine in a location upstream from a fan of the engine, this method comprising:
  a step to determine the number of passing azimuth acoustic vibration modes occurring in the engine without the acoustic attenuation shroud and operating under conditions corresponding to a landing phase and a take-off phase;
  a step to determine the size of the acoustic attenuation shroud in which a regular alternation of first portions and second portions is provided with different first and second thicknesses along the radial direction, the number of alternations being greater than twice the number of passing azimuth acoustic vibration modes.

With this design and this choice of the number of alternations, the shroud causes conversion of passing azimuth acoustic vibration modes in the duct formed by the fan case of the engine, into modes interrupted by this duct, in other words non-passing modes. This shroud thus provides the same or better attenuation than a constant thickness shroud for which the attachment to an existing casing structure is difficult.

Thin portions may also be fitted with conventional attachment means installed at thin portions, such that integration of this shroud into an engine with an earlier design does not require any significant modification to other components of the engine concerned.

The invention relates to a turbofan type aircraft engine comprising a fan case with an inner face provided with an acoustic attenuation shroud designed according to this method and located upstream from a fan of this engine.

The invention also relates to an engine as defined above, in which the shroud is fixed to a fan case of the engine.

The invention also relates to an engine as defined above, in which the first portions form grooves on the outer face of the shroud, these grooves being oriented parallel to the axis of revolution of the shroud.

The invention also relates to an engine as defined above, in which the shroud is provided with attachment means to the case, each attachment means being located at a first portion of this shroud, the first portions being thinner than the second portions.

The invention also relates to an engine as defined above, comprising first free portions and first portions provided with attachment means of the shroud to the case.

DETAILED PRESENTATION OF PARTICULAR EMBODIMENTS

Figure 1:
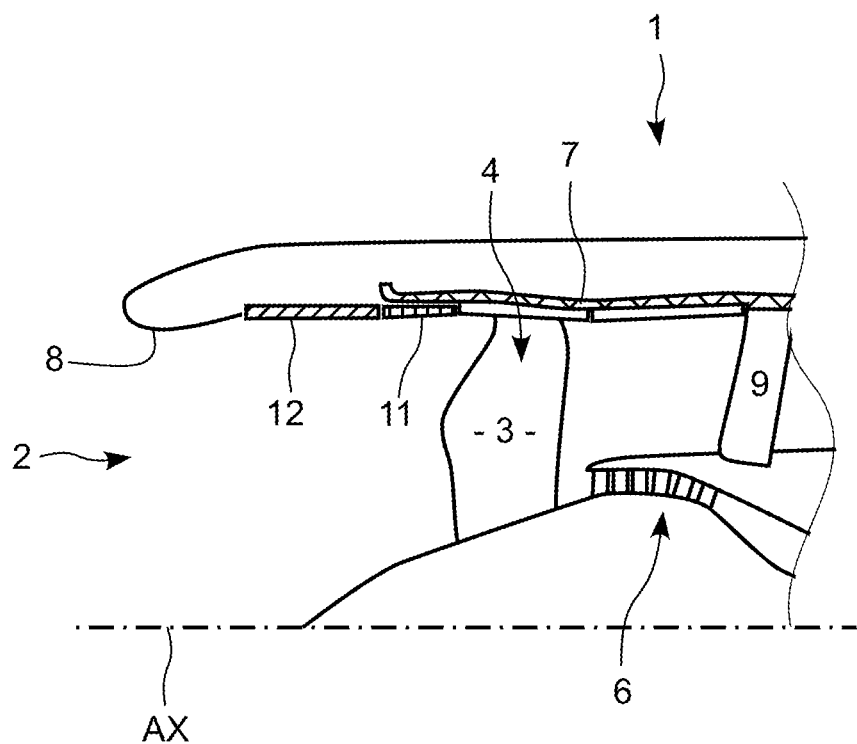
FIG. 1 is a longitudinal sectional view of an engine according to the invention.

As can be seen in FIG. 1, a forward part of a turbofan 1 comprises an air intake duct 2 into which air is drawn before being drawn in by the blades 3 of a fan 4. After passing through the fan region, a so-called core engine air flow then passes through a compressor 6 located immediately after the fan, and a so-called fan air flow that surrounds the core engine flow is propelled in the aft direction to directly generate part of the thrust.

The engine 1 and its components are in a shape of revolution about a longitudinal axis AX. It comprises particularly a fan case 7 surrounding the blades 3 of the fan 4, this case 7 being prolonged in the forward direction by an air inlet lip 8, and this also has a shape of revolution.

The air intake duct 2 of this engine 1 is thus surrounded successively along the AX axis by the air inlet lip 8, and then by the case 7. This case 7 extends in the aft direction beyond the fan 4. It supports components located at the centre of the engine such as the compressor 6, by means of fixed radial arms 9 and the air inlet lip 8 that extends along the prolongation of this case in the forward direction.

The case 7 supports a noise attenuation shroud 11 on its inner face in a zone immediately upstream from the fan 4. A complementary annular noise attenuation panel 12 extends in the prolongation of the shroud 11, beyond it and towards the forward part of the duct 2. This annular panel 12 is thus interposed between the shroud 11 and the forward end of the air inlet lip 8. This annular panel 12 is surrounded by the air inlet lip 8 that supports it and that is itself supported by the case 7. This annular panel 12 has approximately the same inside diameter as the shroud 11, which corresponds approximately to the inside diameter of the case of the fan 4, upstream from the fan.

Figure 3:
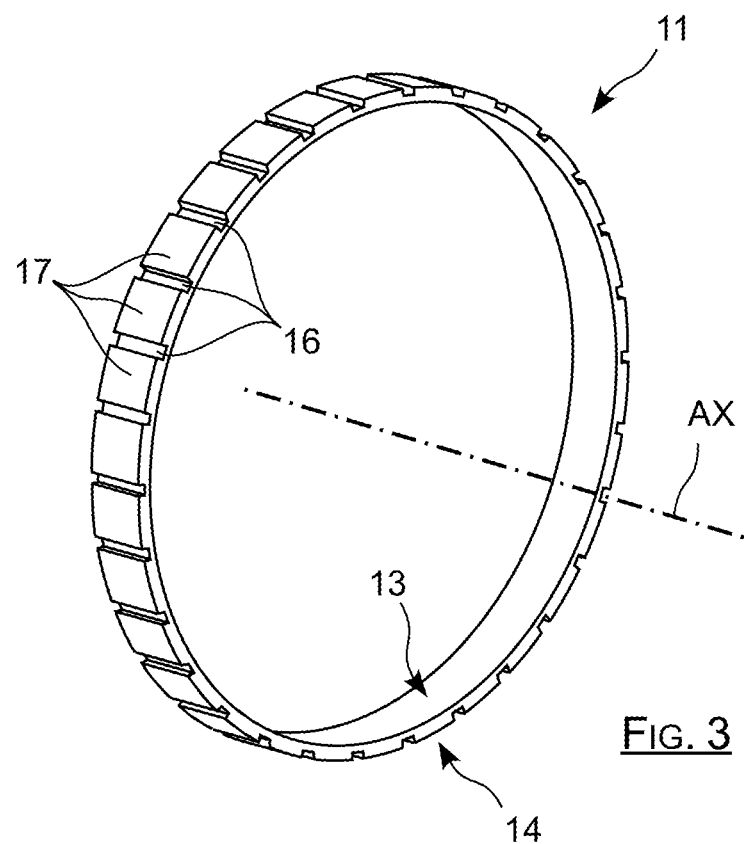
FIG. 3 is a perspective view of the shroud according to the invention shown by itself.
Figure 4:
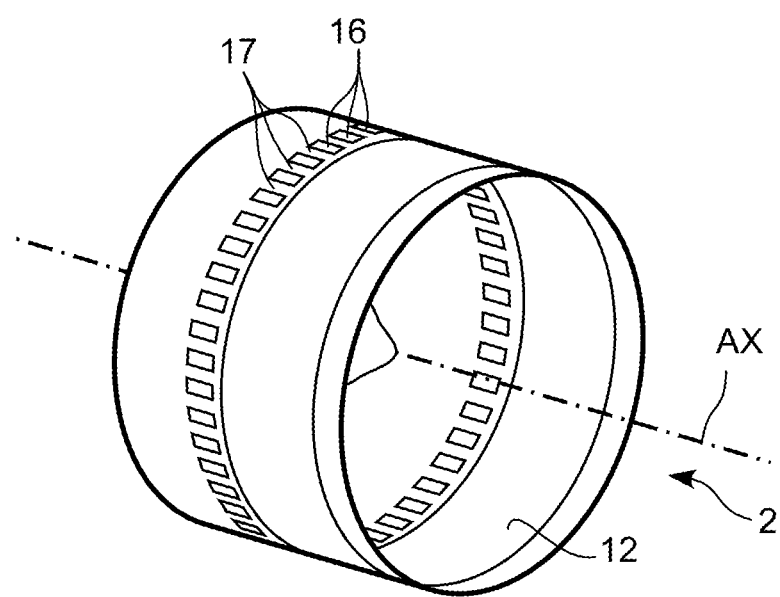
FIG. 4 is a perspective view diagrammatically showing an engine fitted with a shroud according to the invention.

As can be seen in FIGS. 3 and 4, the inner face 13 of the shroud 11 is smooth and uniform and has the shape of a portion of a cylinder, while its outer face 14 comprises grooves 16 parallel to the AX axis uniformly spaced around this axis and that together form local thickness reductions in this shroud 11. The shroud 11 thus comprises a regular sequence of first thin portions 16 and thicker second portions 17. In the example in figures, the thicker portions 17 are longer, in other words their surface area is larger than the thin portions 16.

This shroud 11 is made from a composite material with a honeycomb structure in which the cells are oriented in the radial direction from the AX axis, and are partially open towards the AX axis to form resonators. The first thin portions 16 thus correspond to short cells while the second thicker portions 17 correspond to longer cells.

In general, the thickness corresponds to a height of an acoustic cell in the portion considered, that controls the impedance of this portion.

The first thin portions 16 form discontinuities of the acoustic impedance provided by the shroud 11. Such discontinuities are usually considered as tending to increase the emission level of noise generated by the fan 3 through the air inlet, such that it is usually required to reduce their number.

However on the contrary, the invention makes use of these discontinuities because they make it possible to act on the azimuth acoustic propagation modes making the noise generated by the fan 3, to convert passing azimuth modes into interrupted azimuth modes so as to reduce noise propagation outside the engine.

If there are enough discontinuities, passing azimuth modes are converted into non-passing azimuth modes that cannot propagate in the upstream direction.

According to the invention, the number of first thin portions 16, that is the same as the number of second thicker portions 17 and the number of alternations or discontinuities, is chosen to be more than twice the number of passing azimuth acoustic modes, so as to convert passing or propagating modes into interrupted modes.

The invention thus takes advantage of mode conversion properties provided by the discontinuities and interruption properties provided by the duct to reduce noise propagation outside the engine.

Figure 2:
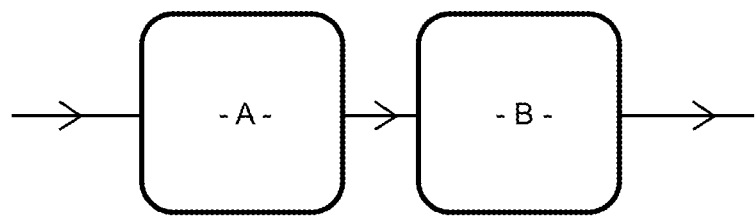
FIG. 2 is a diagrammatic view of steps in the design method according to the invention.

For example, the number of passing azimuth modes for the engine on which the shroud according to the invention should be installed is determined analytically in a step mark A shown in FIG. 2. In practice, the interruption properties of the duct formed by the fan case depend mainly on the frequency considered, the diameter of this duct and the Mach number of the fluid flow that passes through it.

The actual design of the shroud is then made in a step mark B shown in FIG. 2, based on the number of passing azimuth modes identified in step A. Other considerations can then be taken into account, so as to choose a number of alternations larger than the number of passing modes and compatible with other design constraints.

The number of passing modes may be determined based on analytic models used in modal theory to describe acoustic propagation in an annular infinite cylindrical waveguide through which a uniform fluid flow passes. For example, the main elements of this approach are mentioned in the document by Reinsta, S. W.: 2000 "Noise in Turbomachines: Sound propagation in ducts" Von Karman Institute for fluid dynamics LS 2000-02.

Thus, for a given excitation frequency that depends on the rotation speed and the number of fan blades, and for a given diameter that is approximately equal to the diameter of the fan case, and for a uniform flow rate characterised by a Mach number and corresponding to given flight conditions, the analytic calculation can determine acoustic propagation modes occurring in the duct formed by the engine.

Each mode has a specific interruption frequency. Passing modes are modes for which the frequency is higher than their natural interruption frequency. Non-passing modes, in other words that are not interrupted, are those for which the frequency is lower than their natural interruption frequency.

The order discussed herein is the azimuth order; modes propagate along the duct along a direction forming an angle with the longitudinal axis of this duct that increases with increasing azimuth order of the mode considered. Low order azimuth modes propagate along directions close to the longitudinal axis (zero angle).

By definition and according to Bessel functions (definition functions of propagation of acoustic waves in the duct), higher order modes have more energy at the outer radius and are therefore more sensitive to treatments and impedance breaks.

The number of passing modes for given conditions is thus determined by making an analysis to determine the number of modes for which the order is less than the order of the first interrupted mode.

Different values of the number of passing modes can thus be determined based on different fan rotation speeds and different values of the Mach number, for the same engine, so as to then retain the highest number of passing modes among the modes that have been determined, to define the number of discontinuities in the shroud according to the invention.

It is also possible to use an aircraft certification point as a basis to determine the rotation speed and the Mach number representative of the fluid flow, so as to determine the number of passing modes to be used to determine the number of discontinuities required for the shroud so as to efficiently reduce the noise level for this certification point. For example, there are three certification points, specifically two takeoff flight points and one landing flight point.

The selected number of modes may also correspond to the maximum number obtained by scanning a given frequency range and a given range of Mach numbers, based on the analysis elements given above.

For example, the design of the number of alternations may be based on flight conditions at the so-called "Cut Back" certification point, corresponding to the phase in which the engine thrust is reduced when the aircraft has taken off or just before touching down.

For a given engine with a 1.80 m diameter case and installed on a predefined aircraft, the altitude at this certification point is of the order of 445 meters, and the temperature difference from the ISA (International Standard Atmosphere) temperature for this altitude is assumed to be equal to about 10° for simulation and calculation needs.

In fact, the rotation speed of the fan is then about 3600 rpm, and the Mach number characterising the fluid flow in the engine at the fan is of the order of 0.3. Under these conditions, the frequency of the principal vibration mode of the fan that in this case comprises 18 blades is 1080 Hz (3600×18/60).

A so-called interruption calculation associating interruption frequencies with the number of passing modes shows that under these operating conditions, the excitation frequency of 1077 Hz then excites 19 passing azimuth modes. This means that according to the invention, an attenuation shroud having at least 38 alternations can significantly reduce the noise emission level for this engine and under these conditions. Since this is the most severe of the three certification points used for take-off and landing, this means that the choice of a number of alternations higher than 38 can reduce engine noise during take-off and landing phases.

The thicknesses of the first portions and second portions that have no major incidence in themselves, may be chosen to be of the order of 20 millimetres and 30 millimetres respectively. As an illustration, the graphs in FIGS. 5 and 6 display the noise attenuation achieved with the invention for a given engine.

Figure 5:
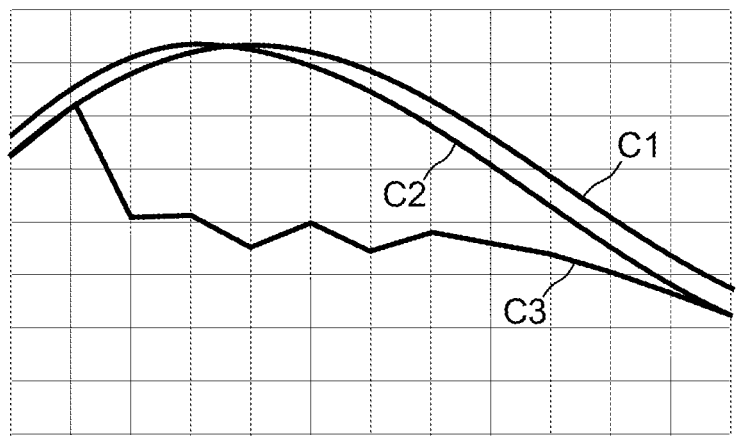
FIG. 5 is a graph showing the attenuation provided by the shroud according to the invention and the attenuation obtained with a perfect shroud and the attenuation obtained without a shroud, for a number of azimuth modes.

The graph in FIG. 5 shows the loss by signal transmission, in other words transmission of noise for a number of modes, the abscissa axis corresponding to their order numbers, and comprises three curves C1, C2 and C3 representative of this attenuation, the ordinate axis corresponding to the attenuation in dB.

Curve C1 that shows this attenuation for the case of an engine fitted with a shroud according to the invention is very close to curve C2 that shows attenuation for a perfect shroud, in other words with constant thickness. On the other hand, the curve C3 that corresponds to attenuation for an engine without a shroud comprising discontinuities results in significantly lower gains.

Figure 6:
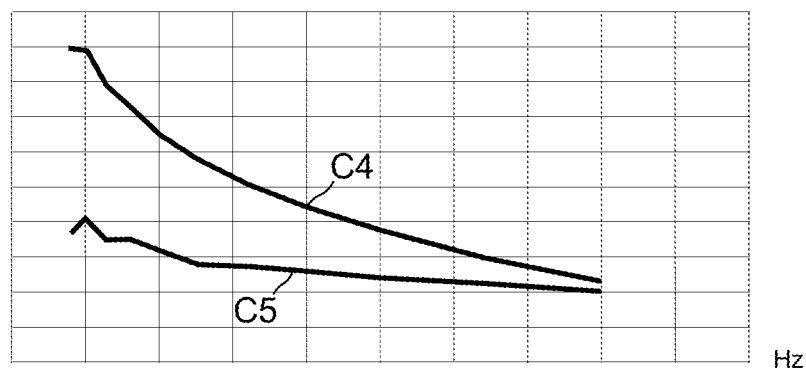
FIG. 6 is a graph showing the attenuation provided by the shroud according to the invention and the attenuation obtained with a shroud according to the state of the art for a relatively low frequency range corresponding to sound frequencies to be reduced during the take-off and landing phases.

Similarly, the graph in FIG. 6 shows the attenuation, graduated in decibels on the ordinate axis, for a wide range of frequencies graduated in Hertz on the abscissa axis usually called "wide band noise". This graph also shows that attenuation is significantly higher with a shroud according to the invention which corresponds to curve C4, than it is for an engine fitted with a perfect shroud or without a shroud, which corresponds to curve C5 in both cases.

This graph in FIG. 6 also shows that the invention provides noise attenuation throughout a low frequency range, which satisfies the need for reduction of noise generated by aircraft during take-off and/or landing phases.

The invention is thus used to manufacture a single piece shroud providing good attenuation, and that can be provided with conventional attachment means installed at its outer periphery, due to its thin portions. There is thus no need to significantly modify other engine components to install the shroud according to the invention.

The invention can thus lead to the design of a shroud with a number of thin portions significantly larger than the number necessary to install attachments of the shroud to the fan case, because this number depends on an acoustic modal analysis.

The shroud according to the invention thus also has a significantly lower mass than a shroud using the entire thickness.

The invention claimed is:

1. Turbofan type aircraft engine comprising a fan case provided with an acoustic attenuation shroud having regular alternation of first portions and second portions provided with different first and second thicknesses along a radial direction, the number of alternations being greater than twice the number of passing azimuth acoustic vibration modes occurring in an engine without the acoustic attenuation shroud and operating under conditions corresponding to a landing phase and a take-off phase, the acoustic attenuation shroud located in the engine, upstream from a fan of the engine.

2. Engine according to claim 1, in which the acoustic attenuation shroud is fixed to an engine case surrounding an air intake duct immediately upstream from the fan.

3. Engine according to claim 2, in which the first portions form grooves on an outer face of the acoustic attenuation shroud, the grooves being oriented parallel to an axis of revolution of the acoustic attenuation shroud.

4. Engine according to claim 2, wherein at least one of the first portion of the attenuation shroud is fixed to the engine case.

5. Engine according to claim 1, wherein the acoustic attenuation shroud is made from a composite material with a honeycomb structure in which cells of the honeycomb structure extend in the radial direction and are partially open to form resonators.

* * * * *